United States Patent
Watanabe (12) 
(10) Patent No.: US 8,712,211 B2
(45) Date of Patent: Apr. 29, 2014

(54) IMAGE REPRODUCTION SYSTEM AND IMAGE REPRODUCTION PROCESSING PROGRAM

(75) Inventor: Tsuyoshi Watanabe, Ebina (JP)

(73) Assignee: Nikon Corporation, Tokyo (JP)

( * ) Notice: Subject to any disclaimer, the term of this patent is extended or adjusted under 35 U.S.C. 154(b) by 894 days.

(21) Appl. No.: 12/385,361

(22) Filed: Apr. 6, 2009

(65) Prior Publication Data

US 2009/0263107 A1    Oct. 22, 2009

(30) Foreign Application Priority Data

Apr. 17, 2008  (JP) ................. 2008-108030

(51) Int. Cl.
*H04N 9/80*    (2006.01)
(52) U.S. Cl.
USPC ................... 386/239; 353/122; 704/220
(58) Field of Classification Search
USPC ........................................... 386/239
See application file for complete search history.

(56) References Cited

U.S. PATENT DOCUMENTS

| 6,985,854 | B1* | 1/2006 | Mitsui ................... 704/220 |
| 2002/0105624 | A1* | 8/2002 | Quori ..................... 353/122 |
| 2005/0180728 | A1* | 8/2005 | Ichioka et al. .......... 386/46 |

FOREIGN PATENT DOCUMENTS

| JP | A-2005-277580 | 10/2005 |
| JP | A-2006-041586 | 2/2006 |

OTHER PUBLICATIONS

Takeo Igarashi and John F. Hughes. 2001. Voice as sound: using non-verbal voice input for interactive control. In Proceedings of the 14th annual ACM symposium on User interface software and technology (UIST '01). ACM, New York, NY, USA, 155-156.*

* cited by examiner

*Primary Examiner* — Carl Colin
*Assistant Examiner* — Syed Zaidi
(74) *Attorney, Agent, or Firm* — Oliff PLC (57) ABSTRACT

An image reproduction system comprising: an image data storage unit that stores a plurality of image data, an image display unit that successively displays a plurality of images based on the plurality of image data, an audio input unit that receives as input sound of a surrounding environment, an audio determination unit that determines whether the sound received as input by the audio input unit is in a predetermined state, and a control unit that controls a display time of the image displayed on the image display unit at the time of determination by the audio determination unit based on the results of determination by the audio determination unit when continuously displaying the plurality of images on the image display unit while successively switching them.

16 Claims, 5 Drawing Sheets

IMAGE REPRODUCTION SYSTEM AND IMAGE REPRODUCTION PROCESSING PROGRAM

CROSS-REFERENCE TO RELATED APPLICATION

The disclosure of the following priority application is herein incorporated by reference: Japanese Patent Application No. 2008-108030 filed on Apr. 17, 2008.

TECHNICAL FIELD

The present invention relates to an image reproduction system reproducing and displaying images stored in a storage unit on an image display unit and an image reproduction processing program making that image reproduction system reproduce the images.

BACKGROUND ART

In the past, in an image reproduction system reproducing and displaying images, when reproducing and displaying images by a slide show format continuously displaying a plurality of images while successively switching them, the display time for each individual image was the same. Further, an image reproduction and display system judging if reference images are continuously captured images based on a difference (time interval) between a time of capturing a reference image and a time of capturing images captured around it and reproducing and displaying the continuously captured images by the same speed as the continuous capture speed (in the case of T frames/sec, 1/T sec) has been proposed (for example, see Japanese Patent Laid-open Publication (A) No. 2006-41586).

In a conventional image reproduction system, when reproducing and displaying images in the slide show format, the display time of the images is set in advance, so there is the problem that even if the viewer desires to view a displayed image longer during the reproduction and display, the next image is shifted to when the set display time elapses.

SUMMARY OF THE INVENTION

Technical Problem

An object of the present invention is to provide an image reproduction system and image reproduction processing program able to control the display times of individual images in accordance with a response of a viewer when continuously displaying a plurality of images while successively switching them.

Solution to Problem

The invention provides an image reproduction system comprising: an image data storage unit that stores a plurality of image data, an image display unit that successively displays a plurality of images based on the plurality of image data, an audio input unit that receives as input sound of a surrounding environment, an audio determination unit that determines whether the sound received as input by the audio input unit is in a predetermined state, and a control unit that controls a display time of the image displayed on the image display unit at the time of determination by the audio determination unit based on the results of determination by the audio determination unit when continuously displaying the plurality of images on the image display unit while successively switching them.

Further, the invention provides an image reproduction processing program embodied in a computer-readable medium, when executed on a computer, performing a process for an image reproduction system that continuously reproduces and displays a plurality of images on an image display unit while successively switching them based on a plurality of image data stored in an image data storage unit, the program comprising: a determination step determining whether a sound of the surrounding environment of the image reproduction system is in a predetermined state while continuously reproducing and displaying the plurality of images on the image display unit while successively switching the images and a control step controlling a display time of an image reproduced and displayed at the time of that determination based on the results of the determination.

Advantages Effects of Invention

According to the image reproduction system and the image reproduction processing program of the present invention, when continuously displaying a plurality of images while successively switching them, if a viewer makes an appreciative sound in response to a reproduced and displayed image etc., it is possible to change or extend the display time of the image currently being reproduced and displayed in accordance with the response of the viewer.

DESCRIPTION OF EMBODIMENTS

Figure 1:
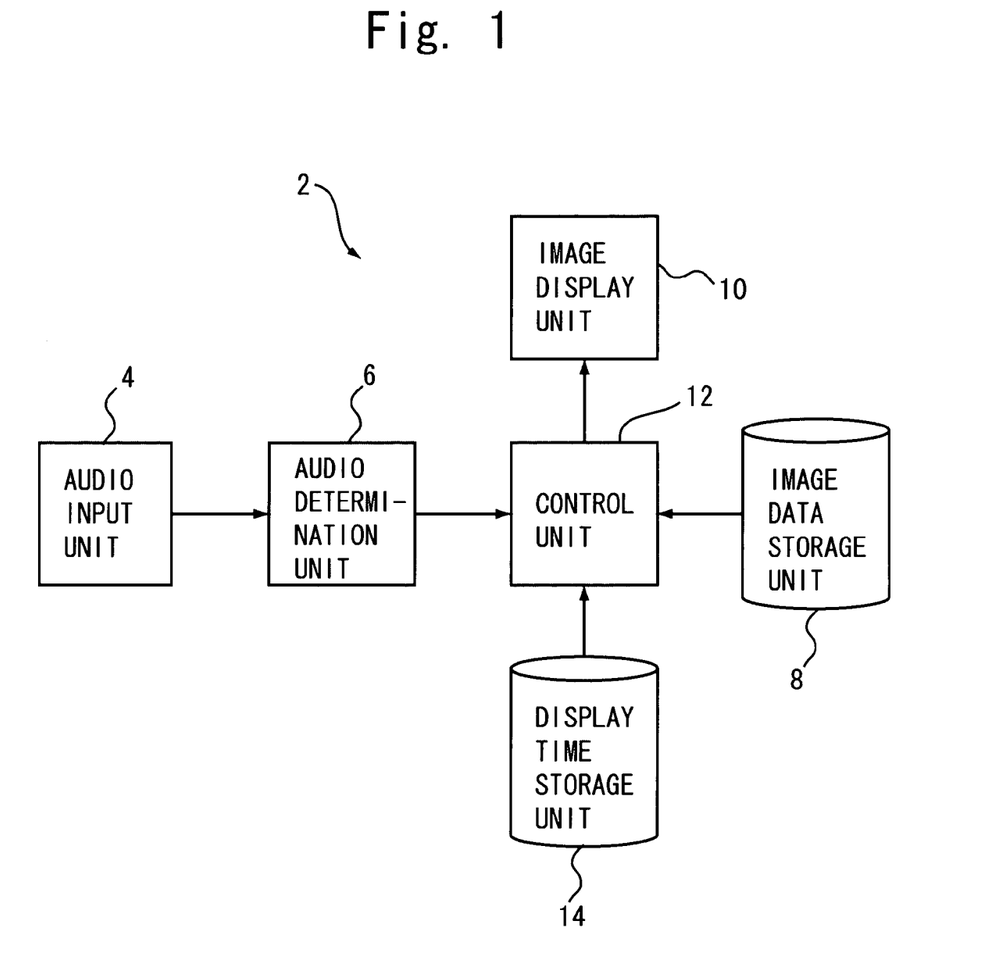
FIG. 1 is a block diagram showing the configuration of an image reproduction system according to a first embodiment of the present invention.

Below, an image reproduction system according to a first embodiment of the present invention will be explained with reference to the drawings. FIG. 1 is a block diagram showing the configuration of an image reproduction system 2 according to the first embodiment. This image reproduction system 2 is for example a personal computer (PC). However, the image reproduction system to which the present invention can be applied is not limited to a personal computer and may also be a digital camera, mobile phone, projector system, or other device having an image reproduction function. As shown in FIG. 1, the image reproduction system 2 is comprised of an audio input unit 4, audio determination unit (audio judgment unit) 6, image data storage unit 8, image display unit 10, control unit 12, and display time storage unit 14.

The audio input unit 4 receives (detects) as input sound of the surrounding environment of the image reproduction system 2. For example, it receives as input an appreciative sound or speaking voice of a viewer viewing the image displayed on the image display unit 10. The audio determination unit 6 determines (judges) if the sound received as input by the audio input unit 4 is in a predetermined state. The predetermined state includes for example the state where the volume of the sound received as input by the audio input unit 4 is a predetermined volume or more etc. The image data storage unit 8 for example stores image data of an image captured by an electronic camera or a camera-equipped mobile phone etc. by the Exif (Exchangable image file format) or other predetermined format.

The image display unit 10 can display an image based on image data stored in the image data storage unit 8. Further, it can for example continuously display a plurality of images while successively switching them each initial display time based on the plurality of image data stored in the image data storage unit 8. The initial display time is the time by which one image is displayed on the image display unit 10 when reproducing and displaying a plurality of images by a slide show format continuously displaying them and is preset for each image. Note that the initial display time can be changed. The set initial display time is stored in a not shown memory etc. Further, an initial display time different for each image may be set. For example, when information on continuously captured images is added as for example tag data to the image data etc., it is also possible to set the initial display time of an independently captured image long or set the initial display times of successively captured images short.

Note that the slide show performed at the image display unit 10 is not limited to one storing display times of the images as initial display times in advance as explained above. For example, when displaying a slide show together with music, it is also possible to switch the images in accordance with breaks in or the tempo etc. of the music or another timing particular to the music.

The control unit 12 reads and runs an image reproduction processing program from a not shown memory etc. and comprehensively controls the components of the image reproduction system 2. In this embodiment, when reproducing and displaying images by the slide show format, at the time of determination by the audio determination unit 6, it controls the display times of the images displayed on the image display unit 10 based on the results of determination by the audio determination unit 6.

The display time storage unit 14 stores a record of change of the display time for each image stored in the image data storage unit 8. The record of change of the display time includes a record of the display time which has been changed when changing the display time of an image displayed on the image display unit 10 under the control of the control unit 12.

Figure 2:
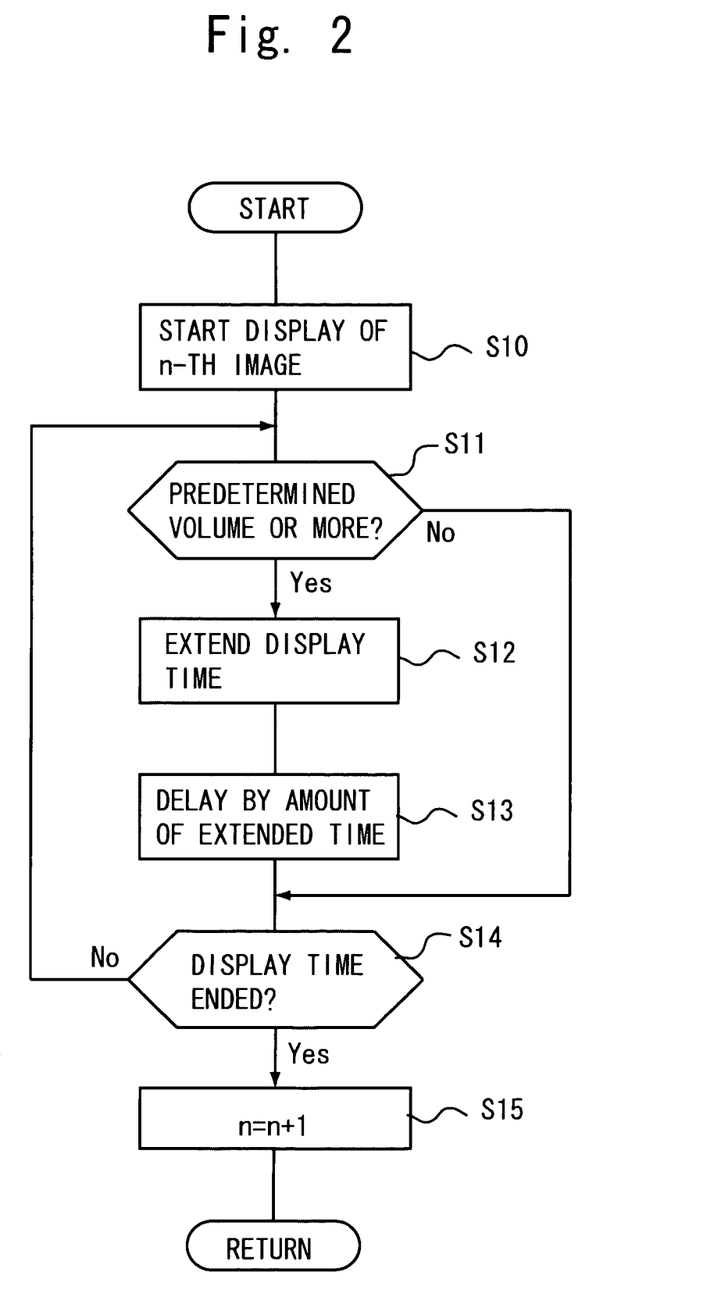
FIG. 2 is a flow chart for explaining an operation using the image reproduction system according to the first embodiment of the present invention to reproduce and display images by a slide show format.

Next, the operation for reproducing and displaying images by the slide show format in the image reproduction system 2 according to the first embodiment will be explained while referring to the flow chart shown in FIG. 2.

First, the control unit 12 starts the reproduction and display of images by the slide show format. That is, the control unit 12 displays n-th images selected as images for display in a slide show among the plurality of images stored in the image data storage unit 8 at an image display unit 10 (step S10). The orders n of the images reproduced and displayed (n=1,2, 3 . . . ) are for example added as tag data to image data of the selected images (images selected to be displayed as a slide show). Note that at step S10, if the reproduction and display of images by the slide show format are started, receipt of sound of the surrounding environment as input by the audio input unit 4 (audio monitor) is also simultaneously started. The audio input operation by this audio input unit 4 is performed in parallel while this slide show is displayed. The audio input unit 4 for example receives as input the emitted sound when a viewer viewing an image displayed on the image display unit 10 makes an appreciative sound or emits another sound and outputs the input audio to the audio determination unit 6.

When the audio determination unit 6 receives audio from the audio input unit 4, it determines whether the volume of the audio is a preset predetermined volume or more (step S11). Note that this reference determination volume, that is, a predetermined volume, can be changed. The set predetermined volume is stored in a not shown memory etc. As the method of judgment of the volume, to average out the magnitude of the volume, an integrated value of the volume for the past several seconds or a value passed through a low pass filter is obtained and the magnitude of the volume is determined based on the obtained value.

When it is determined that the audio is the predetermined volume or more (step S11, Yes), the audio determination unit 6 outputs a signal showing the result of determination to the control unit 12. When the control unit 12 receives a determination signal from the audio determination unit 6, the display time of the image displayed on the image display unit 10 at that time (below, called the current display image) is extended by the predetermined time in addition to the initial display time (step S12). That is, the time of the initial display time of the current display image plus a predetermined time set in advance (extended time) is made the display time of the current display image. Note that this predetermined time (extended time) may be fixed to a single value or may be made variable. Note that this predetermined time is stored in a not shown memory etc. When making the predetermined time variable, it is made variable in accordance with the initial display time. For example, based on the initial display time, the predetermined time (extended time) is made a time of a predetermined ratio with respect to the reference time (predetermined multiple or predetermined ratio). Specifically, if making the predetermined ratio 0.5×, if the initial display time is set at 5 seconds, the predetermined time becomes 2.5 seconds, while if the initial display time is set at 8 seconds, the predetermined time becomes 4 seconds.

Next, the control unit 12 sets a delay of the amount of the extended time determined at step S12 (step S13). Therefore, during this delay time, the routine will not return to step S11 for determination of the volume. The delay of the amount of the extended time is set at step S13 so as to prevent a state where the input volume is a predetermined volume or more from continuing and the processing at step S11 and step S12 from being repeated each time and the extended time from continuing being added. Note that, at step S13, the delay of the amount of the extended time is set, but it need not be the extended time itself. It is also possible to set a preset delay time and set a delay of this amount of delay time regardless of the extended time. Next, it determines if the display time of the current display image has ended (step S14) On the other hand, if it is determined that the audio is smaller than the predetermined volume (step S11, No), the control unit 12 judges if the display time of the current display image has ended without changing the display time of the current display image (step S14).

When it is judged that the display time of the current display image has ended (step S14, No), the control unit 12 continues to display the current display image, returns to the operation of step S11, and repeats the operations of steps S11 to step S13. Therefore, when a signal showing the result of determination of being the predetermined volume or more from the audio determination unit 6 again (step S11, Yes) is output, the control unit 12 again extends the display time of the current display image by the predetermined time. In this way, when an appreciative sound, murmur, talk, or other reaction to a current display image continues long, the display time of the current display image will be extended a plurality of times, so the display time of the current display image with a larger response of the viewer becomes longer.

On the other hand, when it is judged that the display time of the current display image has ended (step S14, Yes), the control unit 12 ends the display of the current display image (n-th image) and adds 1 to the n showing the order of the reproduced and displayed image (step S15). Further, the control unit 12 displays the next image ((n+1)-th image) on the image display unit 10 and repeats the operation shown in the flow chart of FIG. 2.

Note that when the control unit 12 extends the display time at step S12 by the predetermined time from the initial display time, it stores information to the effect of extension by the predetermined time as a record of change of the display time in the display time storage unit 14. The initial display time is set in accordance with the record of change of the display time stored in this display time storage unit 14. For this reason, for example, it is judged that an image with a display time extended several times in the slide show display performed in the past is an image in which viewers are highly interested and therefore the initial display time longer than other images is automatically set, while it is judged that an image with a display time not extended is an image in which the viewers are little interested and therefore an initial display time shorter than the other images is automatically set.

According to the image reproduction system 2 according to the first embodiment, when displaying images by the slide show format, when the volume of the sound received as input by the audio determination unit 6 is the predetermined volume or more, it is possible to extend the display time of the image displayed on the image display unit 10 at the time of determination by the audio determination unit 6. Therefore, for example, when a viewer loudly makes an appreciative sound in response to a reproduced and displayed image or otherwise when the response of the viewer is high, it is possible to extend the display time of the reproduced and displayed image, so the viewer can enjoy the image in which he or she is highly interested in the plurality of images by a longer display time than other images.

Next, the image reproduction system according to the second embodiment of the present invention will be explained. Note that the configuration of this image reproduction system according to the second embodiment is the same as the configuration of the image reproduction system 2 according to the first embodiment, so the explanation will be omitted. Further, in the image reproduction system 2 according to the second embodiment, the explanation will be given using the reference numerals of the configuration of the image reproduction system 2 according to the first embodiment.

Figure 3:
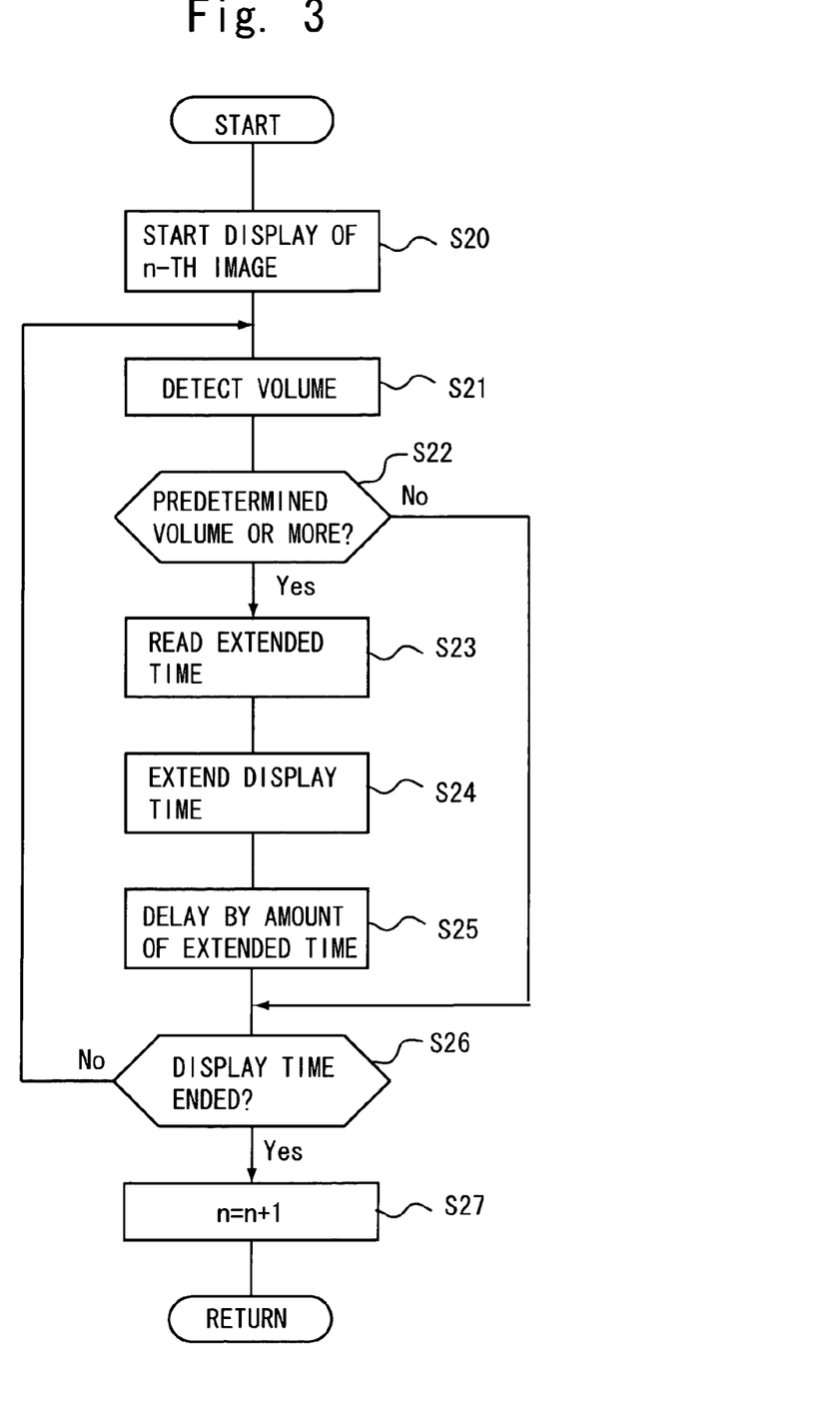
FIG. 3 is a flow chart for explaining an operation using an image reproduction system according to a second embodiment of the present invention to reproduce and display images by a slide show format.

FIG. 3 is a flow chart for explaining the operation of reproducing and displaying images by a slide show format in the image reproduction system 2 according to the second embodiment. Note that the operation of step S20 shown in FIG. 3 is the same as the operation of step S10 shown in FIG. 2 used in the explanation of the first embodiment, so its explanation will be omitted.

When the audio determination unit 6 receives audio from the audio input unit 4, it detects the magnitude of the volume of the audio (step S21) and determines if the volume of the audio is a predetermined volume or more (step S22). When it is determined that the audio is the predetermined volume or more (step S22, Yes), the control unit 12 receives a signal showing the result of determination including the magnitude of the volume of the audio from the audio determination unit 6 and reads an extended time (predetermined time) stored in a not shown memory etc. in accordance with the volume of the audio detected at step S21 (step S23). This extended time is the time set for each volume level when dividing the magnitude of the volume into a plurality of levels. For example, when the volume level is L or more, it is set as the extended time t1, while the volume level is smaller than L, it is set as the extended time t2 (t2<t1). If the viewer shows a greater response, it is envisioned that the volume will become larger, so the greater the volume, the longer the extended time as well.

Next, the control unit 12 extends the display time of the display image from the initial display time by a predetermined time (step S24). That is, it adds the extended time read at step S23 to the initial display time of the display image. Note that the operations of step S25 to step S27 shown in FIG. 3 are the same as the operations of step S13 to step S15 shown in FIG. 2 used in the explanation of the first embodiment, so their explanations will be omitted. On the other hand, when it is determined that the audio is smaller than the predetermined volume (step S22, No), the control unit 12 determines if the display time of the display image has ended without changing the display time of the display image.

According to this image reproduction system according to the second embodiment, when displaying images by the slide show format, if the audio determination unit 6 determines that the volume of the input audio is a predetermined volume or more, it is possible to extend the display time of the image displayed on the image display unit 10 at the time of determination by the audio determination unit 6 by exactly the amount of the predetermined time set in accordance with the magnitude of the volume. Therefore, for example, it is possible to display an image by a longer display time the louder a viewer makes an appreciative sound in response to an image being reproduced and displayed or otherwise expresses strong interest.

Note that in the above embodiments, the audio determination unit 6 determines if the volume of the audio is a predetermined volume or more. However the invention is not limited to this. It is also possible to provide the audio determination unit 6 with an audio recognition unit able to recognize a human sound and to use the audio determination unit 6 to recognize the human sound and determine whether the volume of the human sound is the predetermined volume or more. Specifically, first, the audio determination unit 6 determines at the audio recognition unit if the sound received as input by the audio input unit 4 is the human sound. Next, the audio determination unit 6 determines the volume of the sound only when it is determined to be the human sound. In this case, the audio determination unit 6 determines only the volume of the human sound and does not determine sound emitted by anything other than a person, for example, random noise or pet noise, so the control unit 12 can control the display time with a high precision.

Further, in the above embodiments, the audio determination unit 6 determines whether the volume of the sound is a predetermined volume or more. However, the invention is not limited to this. For example, it is also possible to provide inside the audio determination unit 6 an audio storage (recording) unit in which audio information of a specific person is stored (recorded) in advance, determine whether the input sound is a sound of the specific person by the audio determination unit 6, and determine if the volume of the sound of the specific person is the predetermined volume or more. Specifically, first, the audio determination unit 6 determines if the sound received as input by the audio input unit 4 is a sound of the specific person stored in the audio storage unit. This determination may be performed using known art such as biometric verification technology utilizing a voiceprint expressing an audio spectrum to identify the person. Next, the audio determination unit 6 determines the volume of the sound only when it is determined that the sound is the sound of the specific person. In this case, the audio determination unit 6 determines only the volume of the sound of the specific person and does not determine sound other than sound emitted by the specific person, so for example when requiring only the response of the specific person etc., the control unit 12 can control the display time with a high precision.

Figure 4:
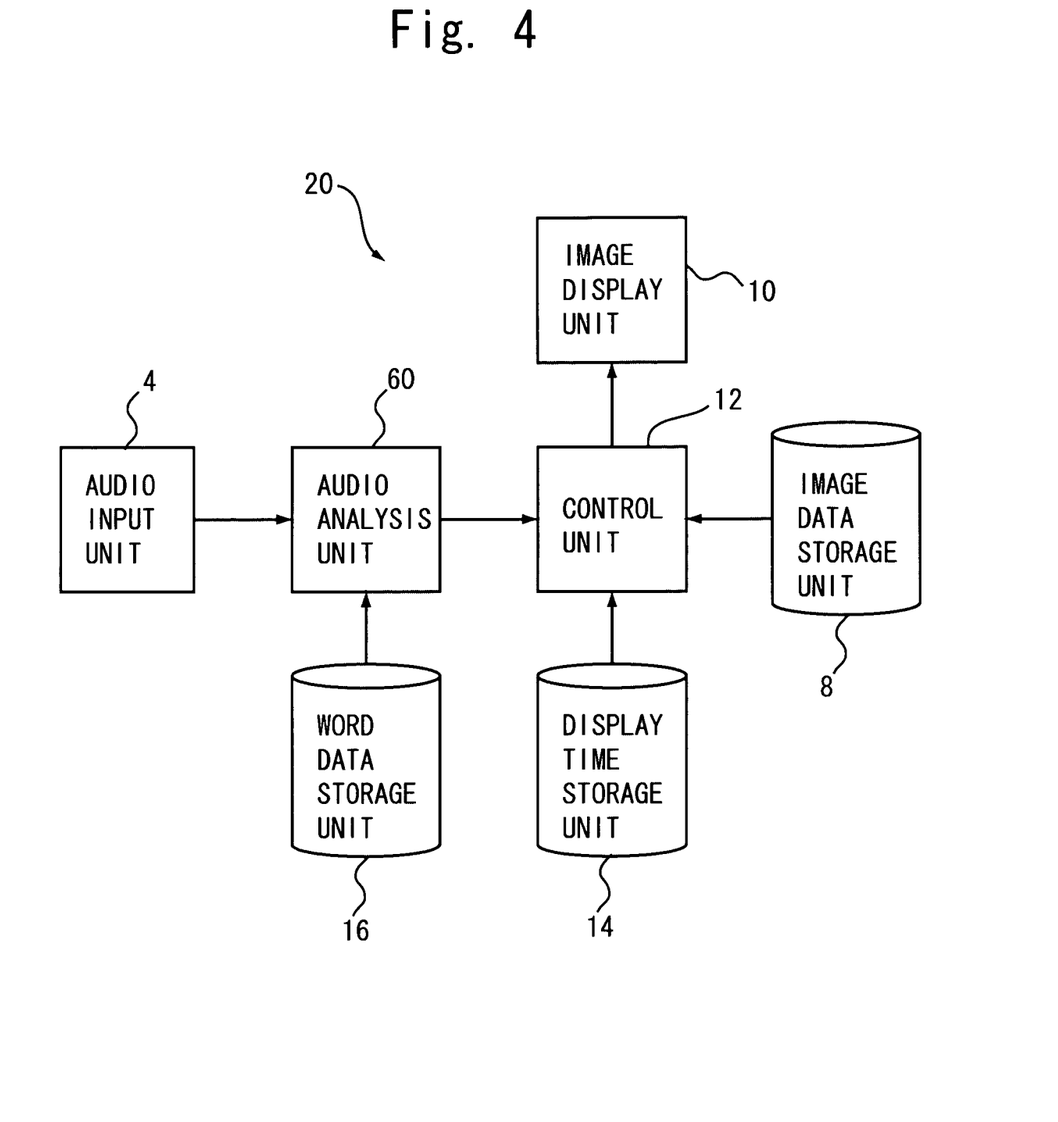
FIG. 4 is a block diagram showing the configuration of an image reproduction system according to a third embodiment of the present invention.

Next, an image reproduction system according to a third embodiment of the present invention will be explained. FIG. 4 is a block diagram showing the configuration of an image reproduction system 20 according to a third embodiment. Note that the configuration of the image reproduction system 20 according to the third embodiment other than the audio analysis unit 60 and a word data storage unit 16 is the same as the configuration of the image reproduction system 2 according to the first embodiment, so the explanation will be omitted. Further, in the image reproduction system 20 according to the third embodiment, parts of the configuration the same as the image reproduction system 2 according to the first embodiment are assigned the same reference numerals for the explanation.

The word data storage unit 16 shown in FIG. 4 stores words which a viewer might utter when expressing interest in a display image, for example, "who?", "where?", "what?", "hey!", "wow!", "huh?", and other data. Further, the word data storage unit 16 stores negative words which a viewer might utter for a display image, for example "nope", "next!", "yuck", and other data. The audio analysis unit 60 uses as audio analysis technology disclosed in for example Japanese Patent Laid-open Publication (A) No. 2001-145180 to analyze words of audio received as input by the audio input unit 4. The control unit 12 controls the display time of the image displayed on the image display unit 10 at the time of analysis by the audio analysis unit 60 based on the results of analysis by the audio analysis unit 60 when reproducing and displaying images by the slide show format.

Figure 5:
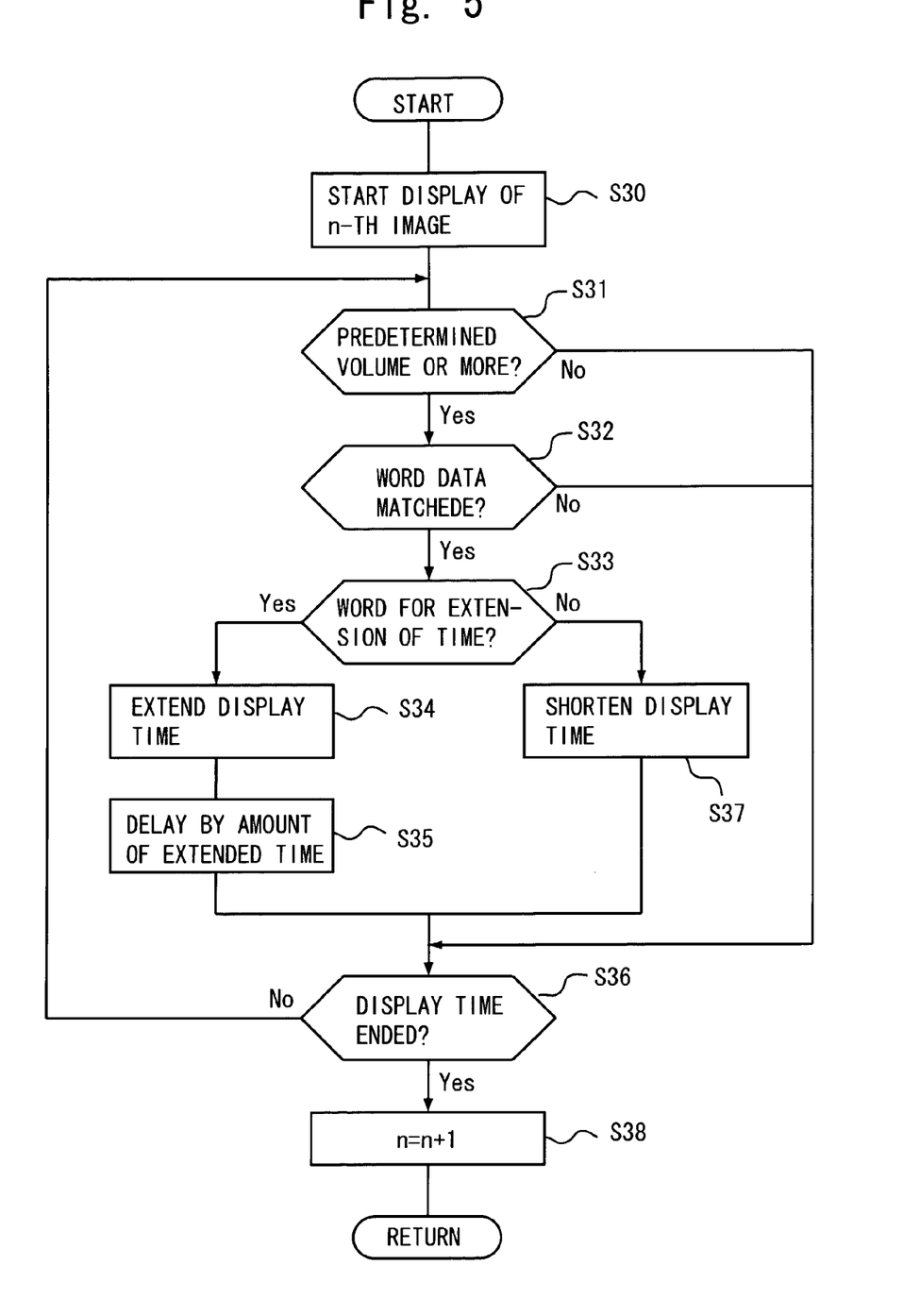
FIG. 5 is a flow chart for explaining an operation using an image reproduction system according to a third embodiment of the present invention to reproduce and display images by a slide show format.

Next, referring to the flow chart shown in FIG. 5, the operation of reproducing and displaying images by the slide show format in the image reproduction system 20 according to the third embodiment will be explained. Note that the operations of step S30 and step S31 shown in FIG. 5 are the same as the operations of step S10 and step S11 shown in FIG. 2 used in the explanation of the first embodiment, so explanations will be omitted.

When it is determined that the audio is a predetermined volume or more (step S31, Yes), the audio analysis unit 60 analyzes the words of sound received as input by the audio input unit 4. Specifically, the audio analysis unit 60 determines if a word of the sound received as input by the audio input unit 4 matches any of the words stored in the word data storage unit 16 (step S32).

When a word of the sound matches (step S32, Yes), the audio analysis unit 60 outputs a signal showing the results of analysis to the control unit 12. The control unit 12 receives a signal showing the results of analysis from the audio analysis unit 60 and determines the type of the word of the input audio. That is, it determines if a word of the input sound might have been uttered when a viewer expressed interest in a display image (word for extending time) or is a negative word uttered by the viewer for the display image (word for shortening time) (step S33).

When the word for extending time (step S33, Yes), the control unit 12 extends the display time of the display image from the initial display time by a predetermined time (step S34). Next, the control unit 12 sets a delay of a predetermined amount of time (step S35) and judges if the display time of the display image has ended (step S36). On the other hand, when not the word for extending time (that is, when being the word for shortening time) (step S33, No), the control unit 12 shortens the display time of the display image from the initial display time by the predetermined time (step S37) and judges if the display time of the display image has ended (step S36).

Note that when the word of the sound does not match at step S32 (step S32, No), the control unit 12 judges if the display time of the display image has ended without changing the display time of the display image (step S36). The operations of step S36 and step S38 shown in FIG. 5 are the same as the operations of step S14 and step S15 shown in FIG. 2 used in the explanation of the first embodiment, so the explanation was omitted.

Note that the control unit 12 stores information to the effect of extending the display by a predetermined time as a record of change of the display time in the display time storage unit 14 when extending the display time by the predetermined time from the initial display time at step S34 and stores information to the effect of shortening the display by the predetermined time as a record of change of the display time in the display time storage unit 14 when shortening the display time by a predetermined time from the initial display time at step S37. In this case, for example, the system may judge an image extended in display time many times to be an image in which viewers are highly interested and set an initial display time longer than other images in advance and may judge an image shortened in display time many times to be an image in which viewers are little interested and set an initial display time shorter than the other images in advance.

According to this image reproduction system according to the third embodiment, when displaying images by the slide show format, if the audio analysis unit 60 judges that a word of the input sound is a word for extending time or a word for shortening time, at the time of analysis by the audio analysis unit 60, it is possible to extend or shorten the display time of an image displayed at the image display unit 10 by the predetermined time in accordance with the results of the analysis. Therefore, for example, when the viewer utters a word showing interest in an image being reproduced and displayed etc., it is possible to extend the display time of the image as being one in which the viewer is highly interested. Further, when the viewer utters a word showing lack of interest in an image being reproduced and displayed, it is possible to shorten the display time of the image as being one in which the viewer is little interested.

Note that this third embodiment stores words for extending time and words for shortening time and extends or shortens the display time in accordance with the types of the words, but it is also possible to configure the system to store only words for extending time and to extend the display time when an input word matches the stored word. Further, it is also possible to configure the system to store only words for shortening time and to only shorten the display time when an input word matches the stored word.

Further, in this third embodiment, when the viewer utters a negative word for a display image, the display time of the display image is shortened, but it is also possible to end the display of the display image (n-th image) and display the next image ((n+1)-th image). Further, it is also possible to configure the system to store words for prompting the next image display ("next!" etc.) in the word data storage unit 16 and ending the display of the display image and displaying the next image when the viewer utters the word prompting the next image display. Further, it is also possible to configure the system to store words prompting an image display in the word data storage unit 16 ("back" etc.) and to end the display of the display image (n-th image) and display the previous image ((n−1)-th image) when the viewer utters the word prompting the previous image display.

Further, this third embodiment stored words for extending time and words for shortening time and extended or shortened the display time in accordance with the type of the words, but for example it is also possible to use as audio analysis technology the technology disclosed in Japanese Patent Laid-open Publication (A) No. 6-139044 to identify the feeling of the viewer from the content of the words uttered by the viewer and extend or shorten the display time in accordance with the viewer's feeling.

Further, in the image reproduction systems according to the embodiments, the control unit 12 reads and executes the image reproduction processing program for performing a process for reproducing images at the image reproduction system 2, 20 from a not shown memory etc. That is, the image reproduction processing program used in the above embodiments makes an image reproduction system 2, 20 execute a determination step determining whether sound of a surrounding environment is in a predetermined state and a control step controlling a display time of an image reproduced and displayed at the time of determination by the determination step. Further, the image reproduction processing program used in the third embodiment makes the image reproduction system 20 execute an analysis step analyzing a human sound. Therefore, according to the image reproduction processing program according the above embodiments, it is possible to extend or otherwise control the display time of the image being reproduced and displayed in accordance with a reaction of a viewer.

Note that in the above embodiments, the explanation was given regarding management of the switching timing of images by the reproduction (display) time, but the present invention is not limited to this. For example, when playing back a slide show together with music as explained above, the switching points of images may be determined for individual music in accordance with the breaks in, tempo, etc. of the music. In such a slide show accompanied with music, to extend a display time based on the results of determination of the audio judgment unit, it is sufficient to perform the processing of extending the switching point of the image to the next switching point.

The embodiments described hereinabove have been presented for easy understanding of the invention and are not intended to limit the invention. Accordingly, the respective elements disclosed in the foregoing embodiments shall be construed to cover all design modifications and equivalents that fall within the technical scope of the invention.

The invention claimed is:

1. An image reproduction device comprising:
at least one processor;
at least one memory, the at least one memory storing instructions that when executed cause the at least one processor to perform as:
an image display unit having an image display function and configured to successively display a plurality of images based on the plurality of image data,
an audio input unit having an audio monitor function and configured to receive, as input, sound of a surrounding environment,
an audio determination unit having an electrical connection with the audio input unit and configured to determine whether the average volume of the sound received as input in a predetermined time period by the audio input unit is a predetermined volume or more, and
a control unit having an electrical connection with the image display unit and the audio determination unit and configured to extend, by a predetermined time in addition to a predetermined initial display time, a display time per one image of the image currently displayed on the image display unit at the time of the determination by the audio determination unit when the audio determination unit determines that the average volume of the sound is the predetermined volume or more when continuously displaying the plurality of images on the image display unit while successively switching the images.

2. The image reproduction device of claim 1, wherein the predetermined time is set in accordance with the volume.

3. The image reproduction device of claim 1, wherein
the audio determination unit is further comprised of an audio recognition unit that recognizes a human sound received as input by the audio input unit, and
the control unit extends by a predetermined time a display time of the image displayed on the image display unit when the audio recognition unit recognizes the human sound.

4. The image reproduction device of claim 1, wherein the audio determination unit is further comprised of an audio storage unit in which sounds of a specific person are stored, and
the control unit extends by a predetermined time a display time of the image displayed on the image display unit when the audio determination unit determines that the sound received as input by the audio input unit matches with the sound of the specific person stored in the audio storage unit.

5. The image reproduction device of claim 1, wherein the audio determination unit is further comprised of an audio analysis unit that analyzes a human sound, and
the control unit extends or shortens by a predetermined time a display time of the image displayed on the image display unit based on the results of analysis by the audio analysis unit on the human sound received as input by the audio input unit.

6. The image reproduction device of claim 1, wherein when continuously displaying the plurality of images while successively switching them at each initial display time previously set for each image, the control unit extends a display time of the image by a predetermined time in addition to the initial display time based on the results of determination by the audio determination unit.

7. The image reproduction device of claim 6, wherein the predetermined time is set in accordance with the initial display time.

8. The image reproduction device of claim 6, wherein the device further comprises a display time change storage unit that stores a record of change of display time for each image, and
the initial display time for each image is set in accordance with the record of change stored in the display time change storage unit.

9. An image reproduction processing program embodied in a non-transitory computer-readable medium, when executed on a computer, performing a process for an image reproduction system that continuously reproduces and displays a plurality of images on an image display unit while successively switching them based on a plurality of image data, the program including:
- a determination step determining whether the average volume of sound of a surrounding environment of the image reproduction system input in a predetermined period is a predetermined volume or more while continuously reproducing and displaying the plurality of images on the image display unit while successively switching the images and
- a control step extending, by a predetermined time in addition to a predetermined initial display time, a display time per one image of an image reproduced and displayed at the time of the determination when the determination step determines that the volume of the sound is the predetermined volume or more.

10. The image reproduction processing program of claim 9, wherein the predetermined time is set in accordance with the volume.

11. The image reproduction processing program of claim 9, wherein
the control step extends by a predetermined time a display time of the image displayed on the image display unit when the determination step recognizes a human sound.

12. The image reproduction processing program of claim 9 wherein the control step extends by a predetermined time a display time of the image displayed on the image display unit when the determination unit determines that the sound matches with sound of a specific person.

13. The image reproduction processing program of claim 9, wherein the determination step includes an analysis step analyzing a human sound, and
the control step extends or shortens by a predetermined time a display time of the image displayed on the image display unit based on the results of analysis by the analysis step.

14. The image reproduction processing program of claim 9, wherein when continuously displaying the plurality of images while successively switching them at each initial display time preset for each image, the control step extends a display time of the image by a predetermined time in addition to the initial display time based on the results of determination by the determination step.

15. The image reproduction processing program of claim 14 wherein the predetermined time is set in accordance with the initial display time.

16. The image reproduction processing program of claim 14 wherein the initial display time for each image is set in accordance with a record of change of display time for each image.

* * * * *